United States Patent [19]

Barrett

[11] 4,244,356
[45] * Jan. 13, 1981

[54] SOLAR COLLECTOR

[75] Inventor: Walter H. Barrett, Woonsocket, R.I.

[73] Assignee: Columbia Chase Corporation, Braintree, Mass.

[*] Notice: The portion of the term of this patent subsequent to Oct. 17, 1995, has been disclaimed.

[21] Appl. No.: 916,130

[22] Filed: Jun. 16, 1978

Related U.S. Application Data

[63] Continuation of Ser. No. 761,450, Jan. 21, 1977, Pat. No. 4,120,288.

[51] Int. Cl.³ .............................................. F24J 3/02
[52] U.S. Cl. .................................... 126/450; 126/447
[58] Field of Search ............... 126/270, 271, 447, 450; 237/1 A

[56] References Cited

U.S. PATENT DOCUMENTS

| | | | |
|---|---|---|---|
| 2,705,948 | 4/1955 | Rostock | 126/271 |
| 3,039,453 | 6/1962 | Andrassy | 126/271 |
| 3,314,414 | 4/1967 | Rowekamp | 126/271 |
| 3,898,979 | 8/1975 | Medico, Jr. | 126/271 |
| 4,003,366 | 1/1977 | Lightfoot | 126/271 |
| 4,007,728 | 2/1977 | Guba | 126/270 |
| 4,038,966 | 8/1977 | Harrison | 126/271 |
| 4,048,981 | 9/1977 | Hobbs | 126/422 |
| 4,068,652 | 1/1978 | Worthington | 126/271 |
| 4,074,706 | 2/1978 | Hajdu et al. | 126/271 |
| 4,084,580 | 4/1978 | Roark | 126/271 |
| 4,120,288 | 10/1978 | Barrett | 126/450 |

FOREIGN PATENT DOCUMENTS 2600973  7/1976  Fed. Rep. of Germany ........... 126/271

Primary Examiner—Henry C. Yuen
Attorney, Agent, or Firm—Robert A. Cesari; John F. McKenna; Andrew F. Kehoe

[57] ABSTRACT

An improved solar collector has a one piece monolithic fiberglass frame and back assembly in which all of the collector components are mounted. A mounting flange integral with the frame facilities securing the collector in place on a roof or other support. The frame has a double wall construction forming internal steps that support the absorber plate and anti-convection cover at the proper locations for maximum heat collection. Further, all fluid connections to and from the absorber plate are made through the frame so that the required plumbing can be brought out in any direction between the frame walls. Suitable insulation is provided in the panel between the absorber plate and the back as well as between the frame walls to minimize radiation losses through the sides and back of the collector.

5 Claims, 7 Drawing Figures

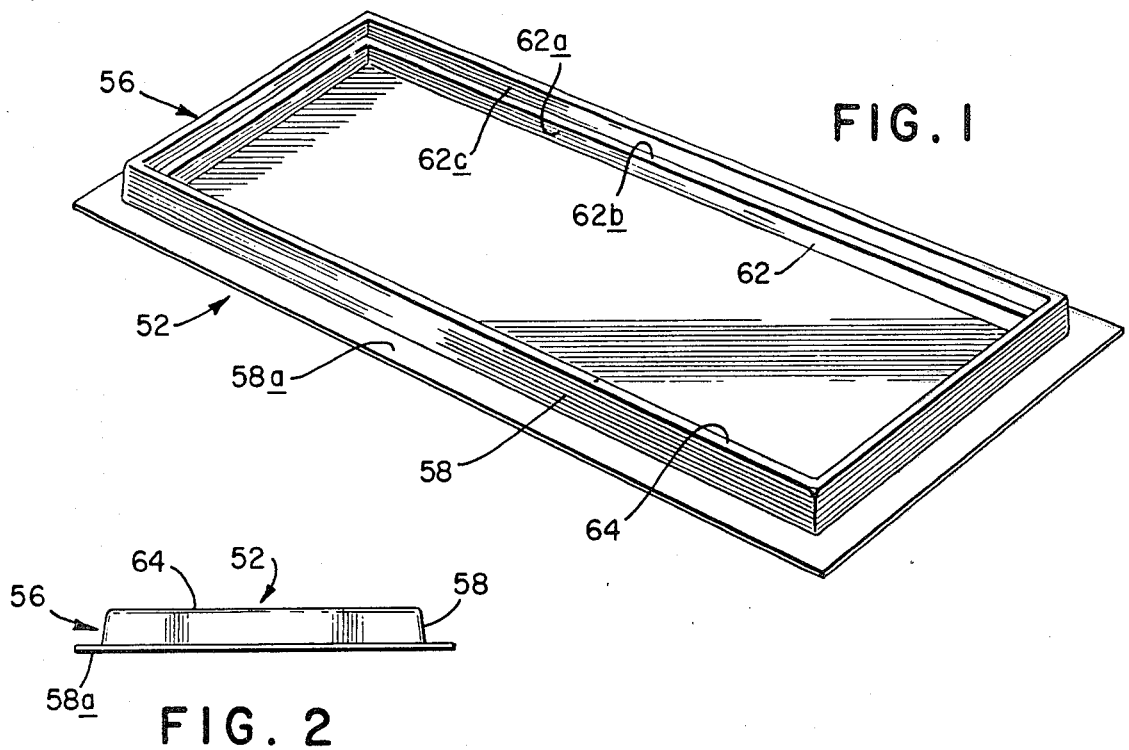
FIG. 1
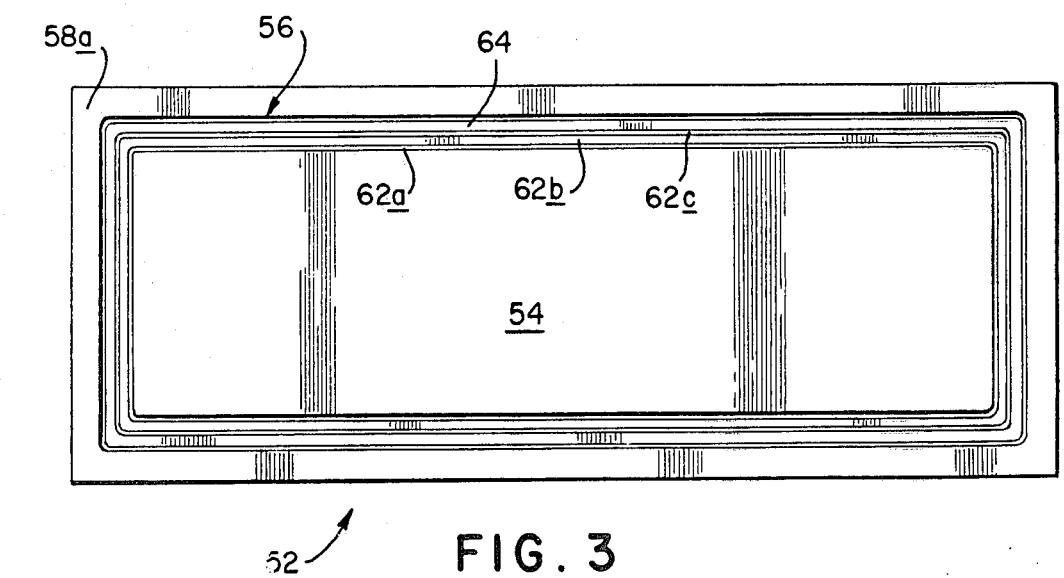
FIG. 2
FIG. 3
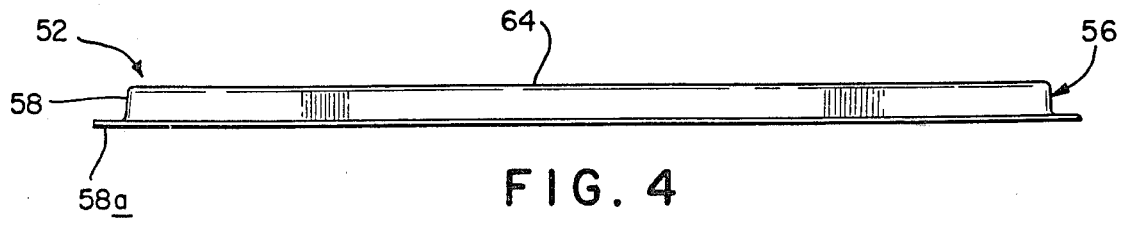
FIG. 4

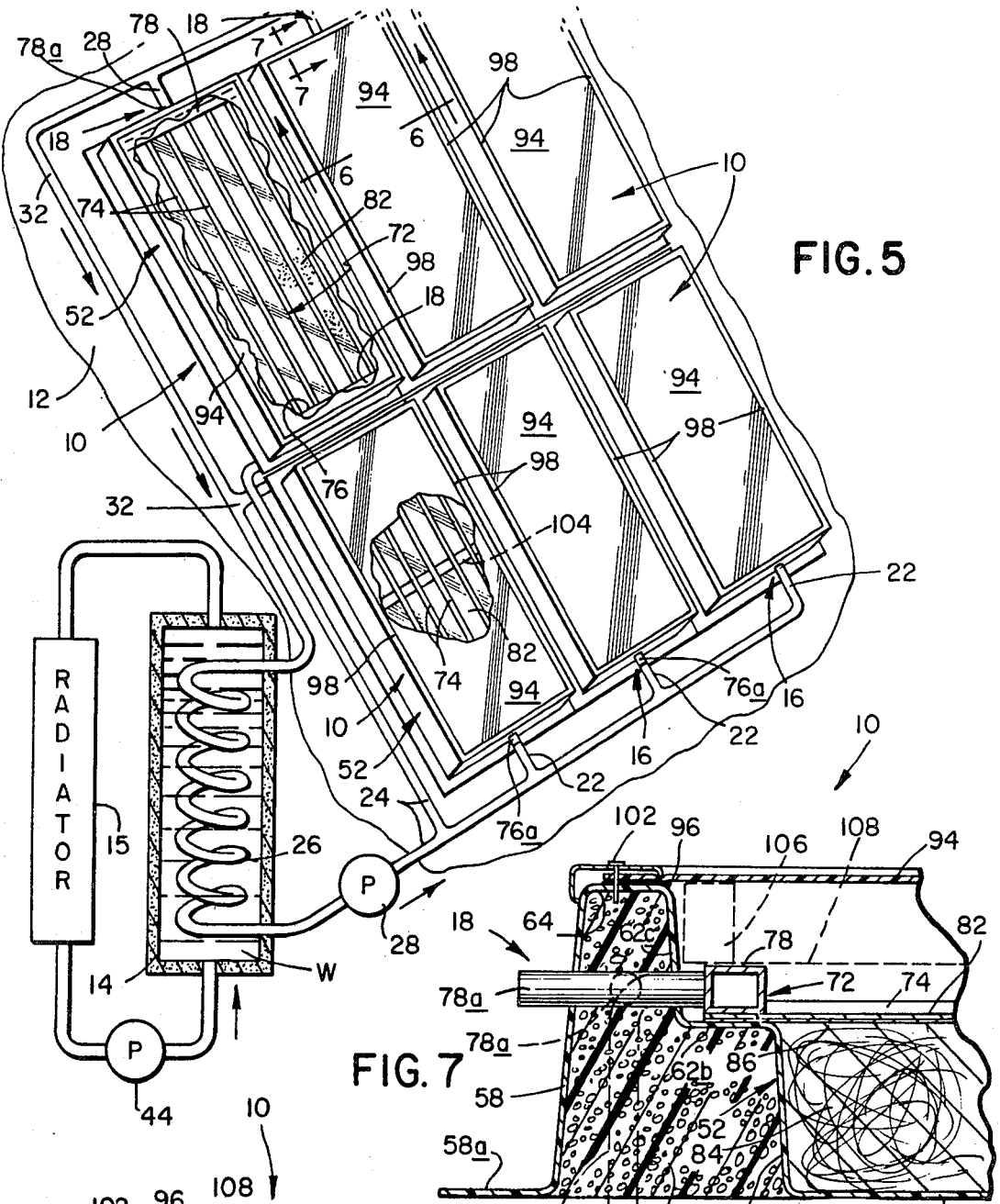

SOLAR COLLECTOR

RELATED APPLICATION

This application is a continuation application of U.S. Application Ser. No. 761,450 filed on Jan. 21, 1977 now U.S. Pat. No. 4,120,288.

BACKGROUND OF THE INVENTION

This invention relates to a solar collector. It relates more particularly to a panel-type solar collector that is particularly appropriate for hot water and space heating applications.

Due to the ever increasing costs of alternative energy sources, heating by solar energy is becoming more prevalent, particularly in homes. The panel-type solar collector with which this invention is particularly concerned, usually includes a large area, blackened absorber plate covered by one or more closely spaced coextensive transparent glass or plastic sheets which trap solar energy by reducing radiation and convection losses from the absorber plate.

The heat so collected is conducted to a fluid medium such as water in intimate thermal contact with the absorber plate. The heated medium is then circulated by a pump in an open loop system as is the case when heating water for a swimming pool. Alternatively, the medium can be circulated in a closed loop including a heat exchanger and used to heat fresh water for cooking or washing or to heat air for space heating purposes.

The factors that most effect the merchantability of solar collectors of this general type are cost, reliability, efficiency and ease of installation. There are many different types of solar collectors presently available. However, invariably these prior units are not entirely satisfactory with respect to one another of the aforesaid criteria.

Some prior collectors employ metal housings and frames for the absorber plates. Consequently, the panels as a whole are relatively heavy and massive, making them expensive to transport to the site and difficult to install. Other conventional panel constructions have absorber plate housings composed of different materials with different coefficients of thermal expansion. Consequently, when these panels are thermally cycled between their operating temperature extremes, cracks and gaps are formed between the various panel parts. Not only do these craks cause heat losses from panels, but they permit moisture to enter the panels. The mositure is deposited as a film on the interior surfaces of the covers inhibiting light transmission to the absorber plates and thereby reducing the overall heating efficiency of the panels.

Still other presently available collectors are designed so that they require a fixed configuration for the plumbing servicing the collectors. While this factor may not be a problem with new construction in which the plumbing can be routed as required, it does create installation difficulties when the panels are retrofitted to an existing building that imposes restraints on the plumbing routes.

Finally, most of the prior panel constructions are relatively expensive to make and install primarily because each panel comprises a relatively large number of parts. Thus, the materials costs are high, but also considerable labor is required to assemble the panels and install them at the site.

SUMMARY OF THE INVENTION

Accordingly the present invention aims to provide a solar collector having a minimum number of individual parts.

Another object of the invention is to provide a collector of this type which is quite easy to assemble and install.

Yet another object of the invention is to provide a solar panel which is not prone to leakage under normal operating conditions.

A further object of the invention is to provide a solar collector which operates relatively efficiently in most climates.

Still another object is to provide a solar collector which is rugged and reliable so that it should have a long and useful life.

An ancillary object is to provide a collector of this type which when incorporated into a solar heating installation is relatively inexpensive to make and maintain.

Other objects of the invention will, in part, be obvious and will, in part, appear hereinafter.

The invention accordingly comprises the features of construction, combination of elements and arrangement of parts as exemplified in the following detailed description, and the scope of the invention will be indicated in the claims.

Briefly, the present solar collector comprises an absorber plate housed in a monolithic fiberglass frame and back assembly. The assembly is provided with a peripheral flange by which the collector panel can be quickly and easily secured to a supporting surface such as a roof. The frame assembly has formed internal surfaces which dictate the proper placement of the absorber plate and its light transmitting anti-convection covers for maximum heat collection. Further, the sides of the assembly have a double-wall construction for accommodating plumbing arranged in the best configuration to most easily connect the collector panels to each other and to the remainder of the solar heating installation. Insulation is provided between the frame side walls to thermally insulate the interior plumbing and to minimize heat losses through the sides of the panel.

The absorber plate component of the collector can be conventional. However, in the present construction it cooperates with the frame and back assembly to form a double wall at the rear of the panel which is filled with thermal insulating material to minimize heat loss through the back of the panel.

Aside from the frame and back assembly and absorber plate, the only other required collector components are a light transmitting fiberglass anti-convection cover which is held in spaced relation above the absorber plate by the frame assembly surfaces and a cover-retaining bezel which is quickly and easily secured to the frame assembly using conventional blind fasteners. The cover has substantially the same coefficient of thermal expansion as the fiberglass frame and back assembly. Consequently, repeated temperature cyclings of the panel during normal operation do not result in leakage at the joints between the frame assembly and the panel cover. Accordingly, the present panel can operate reliably and efficiently for a prolonged period of time without maintenance.

BRIEF DESCRIPTION OF THE DRAWINGS

For a fuller understanding of the nature and objects of the invention, reference should be had to the following detailed description taken in connection with the accompanying drawings, in which:

FIG. 1 is a perspective view of a monolithic solar panel frame and back assembly;

FIG. 2 is an end elevation view thereof;

FIG. 3 is a bottom plan view thereof;

FIG. 4 is a side elevational view thereof;

FIG. 5 is a diagrammatic view on a smaller scale with parts broken away showing a solar heating system including several solar collector panels each including the FIG. 1 assembly;

FIG. 6 is a sectional view on a larger scale along line 6—6 of FIG. 5; and

FIG. 7 is a similar view along line 7—7 of FIG. 5.

DESCRIPTION OF THE PREFERRED EMBODIMENTS

Referring first to FIG. 5 of the drawings, an array of panel-type solar collectors indicated generally at 10 are supported on a suitable surface 12 such as the roof of any building. In the illustrated system, the collectors are intended to heat water for a home heating system. Accordingly the water is circulated in a closed loop between collectors 10 and an insulated water storage tank 14 which supplies hot water for radiators 15.

Each panel has an inlet 16 and an outlet 18. In the illustrated system, the panels are connected in parallel. Therefore, each inlet is connected to a short length of pipe 22 which, in turn, is connected to a header pipe 24 leading to the lower end of a heat exchange 26 in take 14. Each collector outlet 18 connects to a short length of pipe 28 communicating with a header pipe 32 leading to the upper end of heat exchanger 26. The water is circulated between panels 10 and heat exchanger 26 by means of a pump 28 connected in pipe 24. As will be described in detail later, the pipes 22 and 28 connected to the panel inlets and outlets 16 and 18 respectively can approach the panels from different directions.

Thus, in FIG. 5, to simplify the illustration, the pipes 22 in the lower row of panels and the pipes 28 in the upper row approach the panels from their ends. On the other hand, the pipe connections to the opposite ends of those panels are made from below the panels. In actual practice, however, the connections to the panels would be from the same direction.

The water heated by collector panels 10 and circulated through heat exchanger 26 heats a body of water W in tank 14. Water W is, in turn, circulated around a closed loop including radiator 15 by a circulating pump 44.

Of course, collector panels 10 can also be used in a wide variety of other open or closed loop installations for heating water, air, etc. Each collector panel 10 is on the order of three and one-half feet wide, nine feet long and four and one-half inches deep. A typical home heating installation would require approximately 300 to 500 square feet of collector area or about 10 to 17 panels connected in parallel. On the other hand, if the system is used to heat a swimming pool, the collector area should be approximately one-third to one-half of the pool area, depending upon the location and length of the warm season.

The collector panels 10 should face due south and be mounted perpendicular to the sun's rays. As a rule of thumb, they should be disposed at an angle which is approximately the latitude of the installation site plus 15°. When properly installed, each collector panel absorbs over 50% of the incident solar radiation during the middle of the day when delivering water or other heating medium at a temperature of 100° F. to 150° F.

As best seen in FIGS. 1 to 5, each collector 10 comprises a generally rectangular monolithic frame and back assembly 52 made of a suitable relatively lightweight impact resistent, long-lived materials such as fiberglass reinforced resin or ABS resin. The assembly 52 can be shaped from a single sheet of material using conventional molding or vacuum forming techniques.

Assembly 52 includes a rectangular back wall 54 and a side wall 56 projecting up from wall 54 and extending all around that wall. Side wall 56 is actually a double wall having a relatively straight outer wall 58 and an inner wall 62 that is stepped. In other words, the inner wall 62 has a straight upstanding portion 62a integral with the back wall 54 all around the edge. Attached to the free edge of section 62a is a second section 62b which is oriented generally parallel to the back wall 54. A third wall section 62c is integral with the free edge of section 62b and extends upward from back wall 54 generally parallel to the wall section 62a. Finally, the free edge of inner wall section of 62c is connected to the upper edge of the outer wall 58 by a bridging section 64 that lies parallel to the back wall 54 and forms the top of the frame assembly. Thus the side wall of the frame assembly is completely hollow between its inner and outer walls and this space is filled with a closed cell foam material 66 (FIGS. 6 and 7) to provide thermal insulation all round the assembly 52. Finally, a flange 8a integral with the lower edge of outer wall 58 and coplanar with back wall 54 extends all around the assembly.

The monolothic construction of the frame and back assembly 2 assures that there is complete integrity between the back wall 54 and the side wall 56 so that there is no possibility of moisture leaking into the assembly through gaps, cracks or joints between the assembly walls. Further, the stepped, interior wall construction of the assembly provides a box girder or beam all around the assembly which rigidifies it and prevents it from bending or racking during normal handling. Still, all of these advantages are gained without making the assembly so heavy and massive that it is difficult to handle and move about. Finally, the flange 58a which lies in essentially the same plane as the bottom wall 54 provides a very convenient means by which the assembly can be secured to the supporting surface 12 (FIG. 1) so that the assembly back wall 54 lies flush against that surface 12 and thus is fully supported over its entire area.

Referring now to FIGS. 5 to 7, positioned within assembly 52 is a generally rectangular absorber plate shown generally at 72. The absorber plate is of conventional construction. A suitable absorber plate is sold by the Kennecott Copper Corp. under the name Terra-Light. This plate is constructed by metallurgically bonding a series of straight, spaced-apart, parallel tubes 74 of rectangular cross-section to a copper sheet 76. The opposite ends of tubes 74 are connected to inlet and outlet headers 76 and 78 respectively.

The inlet 16 of each panel leads to the inlet header 76 by way of a short stub pipe 78a. Likewise, each panel outlet 18 connects to the header 78 via a stub pipe 78a as best seen in FIG. 7. Suitable openings are formed in the frame assembly side wall 56 to accommodate these short pipes. Depending upon the selected plumbing routing, the stub pipes 76a and 78a can extend from the headers straight through the panel end wall as shown in FIG. 7 (uppermost and lowermost panel ends) and in solid lines in FIG. 7. They can also be angled to extend out through the bottom of the panel assembly as seen in FIG. 1 (intermediate panel ends) and in dotted lines at 78a in FIG. 7 so as to be completely concealed. Finally, the stub pipes can be brought out laterally through one or the other side wall of the panel as seen in dotted lines at 78a in FIGS. 6 and 7. Thus, the present panel has great versatility in terms of accessibility to existing plumbing.

In order to maximize the thermal absorptive characteristic of the absorber plate 72, its entire upper surface is covered with a highly absorptive coating 82 indicated by strippling in FIG. 5. One suitable coating material is black chrome. More preferably, however, a nickel oxide coating is used which is characterized by high absorptivity and relatively low emissivity at the normal operating temperatures of the panel 10.

Before placing the absorber plate 72 in the assembly 52, the space adjacent the assembly back wall 54 is filled with suitable insulating material 84 such as foam or more preferably fiberglass. Also an aluminum foil sheet 86 coextensive with the copper sheet 76 is interposed between that sheet and the insulating material 84 to further minimize heat losses through the back of the panel. Absorber plate 72 is then positioned within the assembly so that its edge margin rests on the inner wall section 62b of the frame assembly. Once the absorber plate is seated on wall section 62b, it is secured by drilling a series of spaced apart holes around the periphery of the absorber plate with the holes extending through the wall section 62b of the frame assembly. The conventional blind fasteners 88, e.g. drive rivets, are driven into these holes to securely anchor the absorber plate 72 and foil sheet 86 to the frame and back assembly 52.

As best seen in FIGS. 6 and 7, because of the special design of the frame and back assembly, the absorber plate 72 is completely insulated except at the face of the panel normally exposed to sunlight. That is, a relatively thick mass of insulating material 66 extends all around the periphery of the absorber plate 72 and under its edge margin between walls 58 and 62, while another relatively thick mass of insulating material 84 underlies the remainder of the absorber plate. Thus, the stepped wall configuration of the frame and back assembly assures that the absorber plate 72 is correctly and reliably positioned within the panel whatever the skill of the assembler and also assures that there will be a minimum heat loss through the sides and back of the panel.

Once the absorber plate 72 is anchored in place, the top of the frame and back assembly is closed by a light-transmitting anti-convection cover 94. Cover 94 is generally rectangular in shape and its dimensions are slightly less than the corresponding outer dimensions of the top wall 64 of the frame assembly. The cover 94 is transparent to incident solar radiation, but is relatively opaque to the energy re-radiated from absorber plate 72. Accordingly, the collector panel traps the solar energy and the resultant heat is conducted by the absorber plate 72 to the fluid flowing through the tubes 74.

While the cover 94 could be made of glass, it is more preferably a sheet of fiber-reinforced plastic on the order of 0.030 inch thick.

Prior to positioning the cover 94 on the frame assembly, a suitable sealant 96, such as silicone, is coated onto the surface 64 to assure that there will be not leakage at the joint between the cover 94 and the frame assembly. Then an anodized aluminum cap trim or bezel 98 is positioned around the periphery of the frame assembly as best seen in FIGS. 5 and 6. Finally, a series of spaced-apart holes are drilled through the bezel and the underlying over 94 and wall 64. Suitable blind fasteners 102, such as drive rivets, are then driven down into these holes to anchor the bezel and cover 94 to frame assembly. Therefore, the present collector panel should be able to operate reliably and efficiently for a relatively long period.

In some cases, it may be desirable to provide added support for the anti-convection cover 94 and also to further inhibit convection currents within the collector. For this, a strip of relatively strong, rigid material, such as wood, can be positioned transversely on top of the absorber plate 72 and secured there by any appropriate means such as blind fasteners or adhesive cement. One such rigidifying strip is indicated in dotted lines at 104 in the lower left hand pane 10 in FIG. 5. The height of the strip should be equal to the distance between the underside of the cover 94 and the tops of the absorber plate tubes 74.

Also in some applications it may be desirable to further minimize heat loss from the panel by providing a second, inner anti-convection cover extending parallel to cover 94. This inner cover can consist simply of a film of light transmitting plastic stretched or shrunk fit on a generally rectangular wooden frame that rests on the absorber plate headers 76 and 78. An inner cover such as this is indicated in dotted lines in FIG. 7 with the frame shown at 106 and the film indicated at 108. Film 108 should be on the order of 2 mm thick and a suitable film material is sold under the name Tedlar by DuPont.

Referring again to FIG. 5, the collector panels 10 should be mounted in parallel for efficient operation and to keep the panels from running at excessively high temperatures that could decrease the efficiency of the overall heating system. When mounting each panel on surface 12, a good quality roofing sealer compound is applied to the underside of mounting flange 58a. Then the panel is placed in position and holes are drilled through the mounting flange and underlying surface 12 at appropriate intervals, e.g. 15 inches. Additional sealer is applied to each mounting hole and the panel is secured in place using nails or other appropriate fasteners. Following this, the heads of the fasteners are covered with still more sealer to assure a good air and watertight seal between the panel and surface 12. The various pipes servicing the panels are usually half-inch copper tubing and these are connected to the panel inlets and outlets 16 and 18 respectively by means of conventional sweat joint couplings.

When properly installed, the panels should operate reliably as part of the overall heating installation and there should be no need to gain access to the interior of panels 10. However, if for some special reason that should become necessary, the blind fasteners 102 securing the bezel 98 can be removed easily by driving out the central pin in the usual way, permitting removal of the bezel and the cover 94. Then when desired, the cover can be re-anchored in the same way described above.

It will be seen from the foreoing then that the improved solar collector provides an efficient means for trapping radiant energy and converting it into thermal energy for heating purposes. However, its weight and mass are kept to a minimum so that the panel is easy to transport and install at the site. The special configuration of the panel frame and back assembly provides minimum heat loss through the sides and back of the panel and makes the panel rugged, reliable and resistent to racking. Further, the assembly configuration assures that the panel absorber plate and anti-convection covers are properly positioned relative to one another for most efficient operation. Yet with all of these advantages the costs of making, installing and maintaining the collector panel is relatively modest.

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

It is further to be understood that the following claims are intended to cover all of the generic and specific features of the invention herein described.

What is claimed is:

1. A solar collector comprising
    A. a monolithic frame formed of a resin material and back assembly, said assembly having
       (1) a back wall;
       (2) an upstanding side wall extending around the periphery of the back wall, said side wall being composed of a pair of spaced-apart inner and outer wall sections, said inner wall section contiguous with said backwall and a bridging web connecting the inner and outer section so as to form a channel all around the collector;
    B. an absorber plate;
    C. means for positioning the absorber plate in the assembly so that the absorber plate is spaced from, and substantially parallel to, the assembly back wall;
    D. a light transmitting outer anti-convection cover substantially coextensive with the frame assembly having a coefficient of expansion about that of said resin material;
    E. means for securing the anti-convection cover to said bridging web, said panel further including a mass of insulation material filling the channel between the side wall sections;
    F. a mass of insulating material occupying the space between the absorber plate and the assembly back wall 2. The panel defined in claim 1 and further including
    A. an inner light transmitting anti-convection cover extending parallel to the absorber plate, and
    B. a means for positioning the inner cover inside the assembly between the outer cover and the absorber plate.

3. The panel defined in claim 1 and further including means for dividing the space within the assembly between the outer cover and the absorber plate into one or more compartments.

4. The panel defined in claim 1 and further including a mounting flange integral with the free edge of the outer side wall section of the assembly, said flange being substantially coplanar with the assembly back wall.

5. The collector defined in claim 1 and further including fluid inlet and outlet conduits extending from the absorber plate outside the collector through at least one of the side wall sections.

* * * * *